United States Patent [19]

Doughty

[11] Patent Number: 4,957,694
[45] Date of Patent: Sep. 18, 1990

[54] REMOVAL OF OBSTRUCTIONS IN THIMBLES OF NUCLEAR POWER REACTORS

[75] Inventor: Haydn C. Doughty, Bourbonnais, Ill.

[73] Assignee: Westinghouse Electric Corp., Pittsburgh, Pa.

[21] Appl. No.: 414,160

[22] Filed: Sep. 28, 1989

Related U.S. Application Data

[62] Division of Ser. No. 277,830, Nov. 30, 1988, Pat. No. 4,885,124.

[51] Int. Cl.$^5$ .............................................. G21C 19/00
[52] U.S. Cl. ..................................................... 376/310
[58] Field of Search ................ 376/310, 316, 254, 260

[56] References Cited

U.S. PATENT DOCUMENTS

| | | | |
|---|---|---|---|
| 4,610,838 | 9/1986 | Gasparro et al. | 376/310 |
| 4,720,369 | 1/1988 | Cadaureille et al. | 376/310 |
| 4,790,976 | 12/1988 | Zahn et al. | 376/316 |
| 4,867,941 | 9/1989 | Le Dantec | 376/316 |

Primary Examiner—Daniel D. Wasil
Attorney, Agent, or Firm—E. F. Possessky

[57] ABSTRACT

In the operation of a power reactor having a pressure bessel (2) containing a core and a plurality of thimbles extending into the core to provide passages for a flux detector, a movable support member (12) located outside of the pressure vessel (2) and carrying a plurality of tubular members (10) each detachably connected to a respective thimble, and a transfer unit (20) normally coupled to the tubular members (10) for introducing a flux detector into a selected thimble via a respective tubular member (10), obstructions are removed from a selected thimble while the reactor remains in operation, by the steps of:

disconnecting at least the respective tubular member from the transfer unit (20);

introducing an obstruction removal device (40,42) into the respective tubular member (10); and advancing the obstruction removal device (40,42) through the respective tubular member (10) and into the selected thimble to the location of the obstruction.

5 Claims, 2 Drawing Sheets

REMOVAL OF OBSTRUCTIONS IN THIMBLES OF NUCLEAR POWER REACTORS

This is a division of application Ser. No. 07/277,830 filed Nov. 30, 1988, now U.S. Pat. No. 4,885,124.

BACKGROUND OF THE INVENTION

The present invention relates to the removal of obstructions which develop in thimbles installed in nuclear power reactors, and relates more particularly to the safe removal of such obstructions while the reactor continues in normal operation.

During the operation of a nuclear power reactor, reactions within the core generate a neutron flux the spatial distribution of which must be mapped in order to insure safe and efficient operation of the reactor. For this purpose, reactors are provided with an array of tubes, termed thimbles, which extend into the reactor core and which are closed at their lower ends so that their interiors are isolated from the pressure existing within the reactor and can thus be maintained at normal atmospheric pressure. These thimbles define paths for flux detectors which can be advanced along the length of each thimble in order to produce neutron flux measurements at various points along the length of each thimble.

During reactor operation, it frequently occurs that obstructions develop in these thimbles due, for example, to the accumulation of lubricating material at points where the thimbles are provided with bends.

While complete removal of the material forming such obstructions requires reactor shutdown, there is a demand in the industry for a procedure which can at least temporarily clear an obstruction, without requiring reactor shutdown, so that the requisite number of thimbles can continue to be used for the flux mapping operation.

A known procedure for achieving this result, which will be described below, has been found to impose stresses on the fitting which secures the thimble to the reactor and has on occasion weakened the fitting to such an extent that the high pressure at the interior of the reactor has caused the thimble to be ejected from the pressure vessel, with an accompanying escape of radioactive coolant in the form of steam and/or water.

SUMMARY OF THE INVENTION

It is a primary object of the present invention to remove obstructions which develop in thimbles installed in nuclear power reactors without requiring reactor shutdown and without creating the danger of thimble ejection.

A more specific object of the invention is to introduce an obstruction removal device into a thimble while reliably preventing ejection of the thimble from the reactor pressure vessel.

The above and other objects are achieved, according to the present invention, in the operation of a power reactor having a pressure vessel containing a core and a plurality of thimbles extending into the core to provide passages for a flux detector, a movable support member located outside of the pressure vessel and carrying a plurality of tubular members each detachably connected to a respective thimble, and transfer means normally coupled to the tubular members for introducing a flux detector into a selected thimble via a respective tubular member, by a method for removing obstructions from a selected thimble while the reactor remains in operation, which method comprises:
disconnecting at least the respective tubular member from the transfer means;
introducing an obstruction removal device into the respective tubular member; and
advancing the obstruction removal device through the respective tubular member and into the selected thimble to the location of the obstruction.

DESCRIPTION OF THE PREFERRED EMBODIMENTS

Figure 1:
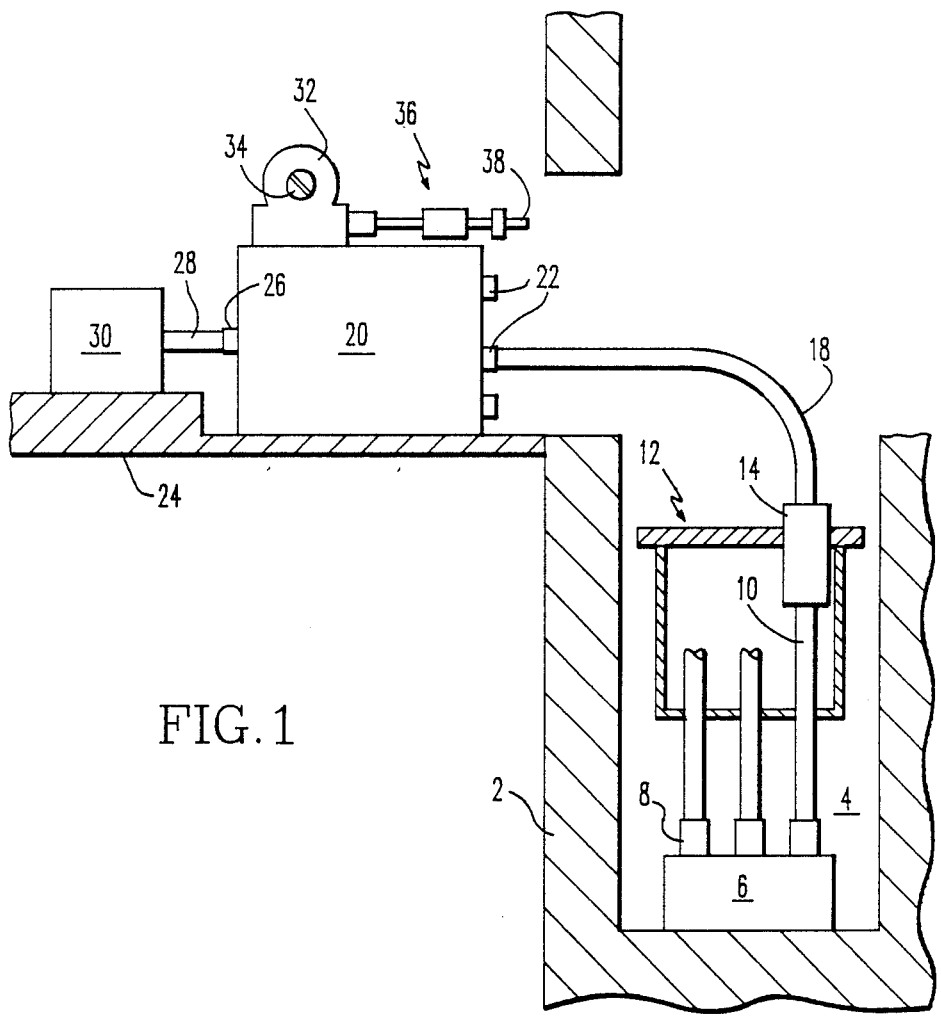
FIG. 1 is a simplified pictorial view illustrating the association of an obstruction removal system according to the invention with flux mapping apparatus for a nuclear reactor.

FIG. 1 shows a portion of a reactor containment structure 2 in the region which includes a seal table room. Structure 2 is formed to have a recess 4 which houses a seal table 6 permanently connected to the reactor pressure vessel and carrying a plurality of high pressure fittings 8 each supporting a respective thimble (not shown) while maintaining a pressure seal between the interior of the reactor and the surrounding region, which includes recess 4 and which is at atmospheric pressure. Each fitting 8 receives a respective tube, or casing, 10 defining a passage which communicates with the interior of the associated thimble. A plurality of tubes 10, one for each thimble, is supported by a movable frame 12 which also carries several multi-path transfer devices 14. Each transfer device 14 is provided at its bottom with a plurality of, for example 10, fittings each connected to a respective tube 10 and at its top with a single fitting connected to a further tube, or casing, 18. Internally, transfer device 14 contains a mechanism which is rotatable to establish a transfer passage between tube 18 and any selected one of the tubes 10 connected to that transfer device 14. Additional transfer devices identical to device 14 are each connected to a separate set of tubes 10 and to a separate further tube similar to tube 18.

The tube 18 of each transfer device 14 is coupled to one port of a respective further multi-path transfer device 20 having, at one side, a plurality of, for example 5, ports each provided with a respective fitting 22 and, at its side opposite from fittings 22, a single port provided with a further fitting 26. Fitting 26 is coupled to a conduit 28 which is mounted to a neutron detector drive unit 30. Device 20 and drive unit 30 rest on a floor 24 which is connected to structure 2.

Similarly to each transfer device 14, each transfer device 20 is provided internally with a mechanism which can be rotated to establish a transfer passage between fitting 26 and any selected one of fittings 22.

A complete system includes a plurality of transfer devices 20 each having an associated drive unit 30 and each associated with a respective transfer device 14. However, it is common practice to provide further tubes via which other fittings 22 of a transfer device 20 can be connected to other transfer devices 14 for emergency operation. In addition, one fitting 22 of each transfer device 20 is coupled to a common thimble for calibration purposes and one fitting 22 of each transfer device 20 is connected to an associated neutron flux detector storage device.

Drive unit 30 contains a cable which is equipped at its end with a neutron flux detector. With transfer devices 14 and 20 set to appropriate positions, drive unit 30 is operated to cause a flux detector to traverse tube 18 and a selected one of tubes 10 and to be advanced along the corresponding thimble in order to obtain neutron flux readings at selected points along the length of the thimble.

All of the structure described thus far is known in the art. Heretofore, to effect temporary removal of an obstruction which has developed in a thimble, it was the practice to disconnect tubes 10 from fittings 8 and move frame 12 away from seal table 6. This action would not, by itself, disturb the pressure seals provided by fittings 8, the interior of each thimble being, in any event, at atmospheric pressure. Then, a cleaning tool was inserted directly into the affected thimble via the associated fitting 8. When this was done, the cleaning action frequently caused undue movements of the thimble in the region of the associated pressure fitting 8, resulting in loosening of the fitting components and thereby reducing the ability of the fitting, which may be a Swagelok TM device, to hold the thimble in place against the high pressure existing within the reactor pressure vessel. Therefore, it has occurred that the high pressure existing within the reactor pressure vessel would result in a forceful ejection of the thimble, followed by expulsion of radioactive coolant in the form of steam.

According to the invention, this undesirable result is prevented by effecting an obstruction removal operation while moveable frame 12 remains in place and tubes 10 remain connected to their associated fittings 8. The presence of tubes 10 helps to reduce stresses on fittings 8 during a cleaning operation, while if a fitting should be loosened, the presence of frame 12 will block complete ejection of the associated thimble.

In order to effect obstruction removal, there is provided, according to the present invention, a manual drive unit 32 containing a cable, which can be identical to the neutron detector cables generally used in such systems, the cable being wound on a reel within unit 32 and the reel being supported by a hub 34 provided with a slot for receiving a tool which will effect manual rotation of the reel. The cable extends through a pipe 36 having, at its free end, an adapter fitting 38, which may be a Swagelok TM device constructed to be coupled to that end of tube 18 which is normally connected to an associated fitting 22.

In order to effect removal of an obstruction, tube 18 is removed from its associated fitting 22 on transfer device 20 and reconnected to adapter fitting 38, tube 18 normally having a sufficient length and flexibility to permit its end to be displaced by the required amount. If a flux detector is present in tube 18, the above step must be preceded by retraction of the flux detector into device 20.

Transfer device 14 is actuated, if necessary, to connect tube 18 to the appropriate tube 10, after which hub 34 is rotated to advance the cable disposed in unit 32, with a suitable cleaning brush attached to the free end of the cable, through tube 18, transfer device 14, the connected tube 10, and the associated thimble until the obstruction has been reached and cleared. The cable in unit 32 is given a sufficient length to cause the attached cleaning tool to travel as far as necessary along a thimble.

If obstructions must be removed from several thimbles connected to the same transfer device 14, hub 34 is rotated to retract the cleaning tool at least into tube 18, after which transfer device 14 is rotated to establish connection with the tube 10 associated with the next thimble to be cleaned and the cleaning operation described above is repeated.

If it is necessary to remove an obstruction from a thimble which is associated with another one of the transfer devices 14 whose tube 18 is connected to another port of the illustrated transfer device 20, the tube corresponding to tube 18 which is connected to the other fitting 22 of transfer device 20 is disconnected from its associated fitting 22 and connected to adapter fitting 38, in the manner described above.

If it is desired to limit the travel of the cleaning tool along a thimble, the associated cable can be provided with a suitable stop in a manner known in the art.

After an obstruction has been removed, the cable housed in unit 32 can be fully retracted until the cleaning tool comes into contact with fitting 38. Then, tube 18 can be removed from fitting 38 and the cleaning tool can be replaced with a "dummy" neutron detector, which is a simple metal piece having the same external shape and dimensions as a neutron detector. Then, tube 18 can be reconnected to fitting 38 and the cable housed in unit 32 can be reintroduced into the thimble to advance the dummy detector along the length of the thimble and thus assure that the obstruction has been satisfactorily cleared.

For clearing many types of obstructions, it is sufficient to employ the same type of cable as that used to displace a detector, but with no detector attached, in which case obstruction removal is effected by the exposed cable end. However, in order to improve the obstruction removal operation, it is preferred to mount at the free end of the cable a cleaning tool in the form of a brush similar to those employed for cleaning rifle barrels.

Figure 2:
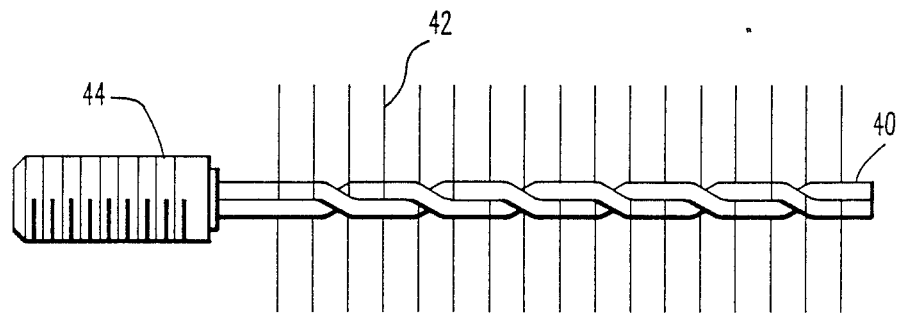
FIG. 2 is an elevational view of an obstruction removal tool usable in the system shown in FIG. 1.

An example of such a cleaning tool is illustrated in FIG. 2 and is composed of a pair of twisted wires 40 carrying bristles 42, only a few of which are shown, extending in different angular directions to form a cylindrical brushing surface. Wires 40 are secured, as by welding, to a connector 44 provided with an external screw thread.

Figure 3:
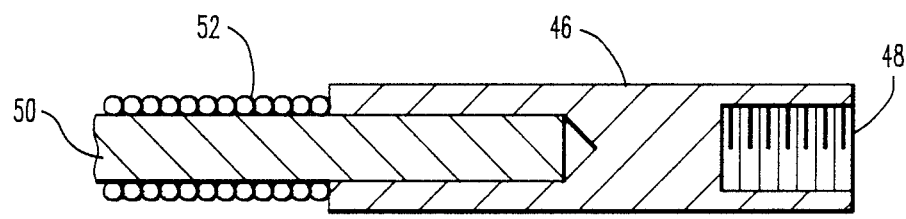
FIG. 3 is a cross-sectional view of a connector for the tool of FIG. 2 attached to a drive cable.

A connector 46 secured to the free end of a detector cable for attachment of the cleaning tool of FIG. 2 is shown in FIG. 3. Connector 46 is provided at its right-hand end and with an internally threaded bore 48 in which connector 44 of FIG. 2 can threadedly engage. The left-hand end of connector 46 is provided with a bore which receives the solid core 50 of a detector drive cable. Core 50 is surrounded by a helically wound wire 52 via which displacement forces can be imposed on the cable. Core 50 may be welded or otherwise bonded to connector 46, which can alternatively be used to carry a dummy flux detector.

While the description above shows particular embodiments of the present invention, it will be understood that many modifications may be made without departing from the spirit thereof. The pending claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

WHAT IS CLAIMED:

1. In the operation of a power reactor having a pressure vessel containing a core and a plurality of thimbles extending into the core to provide passages for a flux detector, a movable support member located outside of the pressure vessel and carrying a plurality of tubular members each detachably connected to a respective thimble, and transfer means normally coupled to the tubular members for introducing a flux detector into a selected thimble via a respective tubular member, a method for removing obstructions from a selected thimble while the reactor remains in operation, said method comprising:

disconnecting at least the respective tubular member from the transfer means;

introducing an obstruction removal device into the respective tubular member; and advancing the obstruction removal device through the respective tubular member and into the selected thimble to the location of the obstruction.

2. A method as defined in claim 1 wherein the reactor further includes a multi-path transfer device mounted on the moveable support member and connected to the plurality of tubular members, and an additional tubular member having two ends, one of which is connected to the transfer device and the other of which is normally connected to the transfer means, and wherein said step of disconnecting is carried out by disconnecting the other end of the additional tubular member from the transfer means and said step of introducing is carried out by introducing the obstruction removal device into the respective tubular member via the additional tubular member.

3. A method as defined in claim 2 wherein the obstruction removal device is a brush.

4. A method as defined in claim 2 wherein said step of introducing is carried out by connecting the obstruction removal device to a cable and advancing the cable through the additional tubular member, the respective tubular member and the selected thimble.

5. A method as defined in claim 1 wherein said step of introducing is carried out by connecting the obstruction removal device to a cable and advancing the cable through the respective tubular member and the selected thimble.

* * * * *